United States Patent
Mangal (10) Patent No.: US 8,139,585 B1
(45) Date of Patent: Mar. 20, 2012

(54) METHOD AND SYSTEM FOR CONTROLLING SESSIONS FROM A SUBSCRIBER TERMINAL

(75) Inventor: Manish Mangal, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 2707 days.

(21) Appl. No.: 10/616,670

(22) Filed: Jul. 10, 2003

(51) Int. Cl.
*H04L 12/28* (2006.01)
*G06F 15/16* (2006.01)

(52) U.S. Cl. .................................. 370/395.2; 709/228
(58) Field of Classification Search .................. 370/254, 370/351–430, 395.2, 395.21; 707/1–4, 6
See application file for complete search history.

(56) References Cited

U.S. PATENT DOCUMENTS

| | | | | |
|---|---|---|---|---|
| 5,838,766 A * | 11/1998 | Rand | ............................... | 370/244 |
| 6,064,653 A * | 5/2000 | Farris | ............................ | 370/352 |
| 6,175,622 B1 * | 1/2001 | Chiniwala et al. | ............ | 379/219 |
| 6,185,300 B1 * | 2/2001 | Romesburg | ................... | 370/290 |
| 6,421,324 B1 * | 7/2002 | Boyle et al. | ................... | 370/261 |
| 6,449,497 B1 * | 9/2002 | Kirbas et al. | ................... | 455/564 |
| 6,668,049 B1 * | 12/2003 | Koch et al. | ..................... | 370/352 |
| 6,741,695 B1 * | 5/2004 | McConnell et al. | .......... | 370/352 |
| 6,765,912 B1 * | 7/2004 | Vuong | ........................... | 370/352 |
| 6,771,639 B1 * | 8/2004 | Holden | ......................... | 370/352 |
| 6,920,455 B1 * | 7/2005 | Weschler | ...................... | 709/227 |
| 6,996,087 B2 * | 2/2006 | Ejzak | ........................... | 370/352 |
| 7,023,825 B1 * | 4/2006 | Haumont et al. | ............. | 370/338 |
| 7,043,266 B2 * | 5/2006 | Chaturvedi et al. | .......... | 455/519 |
| 7,167,447 B2 * | 1/2007 | Puuskari et al. | ............. | 370/352 |
| 7,200,139 B1 * | 4/2007 | Chu et al. | ..................... | 370/352 |
| 7,254,643 B1 * | 8/2007 | Peters et al. | ................... | 709/246 |
| 7,289,493 B1 * | 10/2007 | Vera | ............................... | 370/352 |
| 7,289,522 B2 * | 10/2007 | Gallant | ......................... | 370/401 |
| 7,313,227 B2 * | 12/2007 | Jones | ............................. | 455/415 |
| 2001/0016492 A1 * | 8/2001 | Igarashi et al. | ............... | 455/433 |
| 2002/0034166 A1 | 3/2002 | Barany et al. | | |
| 2002/0159440 A1 * | 10/2002 | Mussman et al. | ............. | 370/352 |
| 2002/0167946 A1 * | 11/2002 | Gallant | ......................... | 370/389 |
| 2003/0012177 A1 | 1/2003 | Vassilovski | | |
| 2003/0035401 A1 * | 2/2003 | Shaheen et al. | ............... | 370/341 |
| 2003/0043803 A1 * | 3/2003 | Hooper | ......................... | 370/432 |
| 2003/0063623 A1 * | 4/2003 | Leslie et al. | ................... | 370/389 |
| 2003/0091026 A1 * | 5/2003 | Penfield et al. | ............... | 370/352 |
| 2003/0193961 A1 * | 10/2003 | Moore et al. | ................... | 370/401 |
| 2004/0042600 A1 * | 3/2004 | Tripathi et al. | ........... | 379/201.12 |
| 2004/0072593 A1 | 4/2004 | Robbins et al. | | |
| 2004/0095923 A1 * | 5/2004 | Ejzak et al. | ................... | 370/352 |
| 2004/0095925 A1 * | 5/2004 | Cody et al. | ..................... | 370/352 |

(Continued)

OTHER PUBLICATIONS

Handley and Jacobson, "SDP: Session Description Protocol," Network Working Group, Apr. 1998.

(Continued)

*Primary Examiner* — Chirag Shah
*Assistant Examiner* — Joshua Smith (57) ABSTRACT

A method and system for providing users with the ability to control the configuration of data session initiated to connect terminals connected to the public-switched telecommunications network ("PSTN") to services available on data networks. A legacy terminal may initiate a Voice-Over IP connection to a remote terminal by dialing the destination identifier of the remote terminal and a session code. The session code corresponds with one of several session profiles or sets of data session parameters defining characteristics of the data session. A media gateway controller detects the session code and retrieves the corresponding session profile to initiate the data session using the selected session profile.

24 Claims, 5 Drawing Sheets

U.S. PATENT DOCUMENTS

| | | | |
|---|---|---|---|
| 2004/0141514 A1* | 7/2004 | Delaney et al. | 370/410 |
| 2004/0165703 A1* | 8/2004 | Jones | 379/88.13 |
| 2004/0196826 A1 | 10/2004 | Bao et al. | |
| 2004/0228324 A1* | 11/2004 | Alexiou et al. | 370/352 |
| 2004/0233892 A1* | 11/2004 | Roberts et al. | 370/352 |
| 2005/0088966 A9* | 4/2005 | Stewart | 370/218 |
| 2006/0077932 A1 | 4/2006 | Takeda et al. | |
| 2008/0013531 A1* | 1/2008 | Elliott et al. | 370/356 |

OTHER PUBLICATIONS

U.S. Appl. No. 11/348,644, filed Feb. 7, 2006.
Office Action from U.S. Appl. No. 11/348,644, dated Dec. 12, 2008.
Office Action from U.S. Appl. No. 11/348,644, dated Jun. 5, 2009.
Office Action from U.S. Appl. No. 11/348,644, dated Dec. 4, 2009.
Office Action from U.S. Appl. No. 11/348,644, dated Jun. 10, 2010.

* cited by examiner

METHOD AND SYSTEM FOR CONTROLLING SESSIONS FROM A SUBSCRIBER TERMINAL

BACKGROUND OF THE INVENTION

1. Field of the Invention

The present invention relates to initiating telecommunications connections having packet-based data sessions and, more particularly, to controlling the packet-based data sessions from a legacy device.

2. Description of Related Art

In traditional telephone systems, each telephone is linked by an access channel (landline or wireless) to a local switch. The local switch provides connectivity with the public switched telephone network (PSTN). When a user places a call from one telephone that is served by a local switch to a remote telephone that is served by a remote switch, the user's telephone sends dialed digits to the local switch, and the local switch responsively signals to the remote switch (e.g., with industry standard "ISUP" signals) in an effort to set up the call. The remote switch then rings the remote telephone, and, when a user answers the remote telephone, the remote switch signals back to the local switch, and the local switch connects the call through the PSTN to the remote switch. The users may then communicate with each other.

By analogy, in contemporary packet-switched communication systems, each legacy terminal (e.g., telephone, mobile station, computer or other data-capable device) may be linked by an access channel with a media gateway. A media gateway provides legacy terminals with connectivity over a packet-switched network such as the Internet. A media gateway controller operates in conjunction with media gateways by receiving information about the connection. The media gateway controller uses the information to initiate the data session on the packet switched network. In this scenario, a caller legacy terminal may be capable of sending and receiving traditional PSTN signaling and media signals to and from an originating media gateway. The originating media gateway may communicate data packets (such as IP packets) with a terminating media gateway connected to a callee legacy terminal. The legacy terminals may therefore communicate with each other using a data packet communications session between the media gateways to which they are connected. Such a communications connection is known in the art as a "voice over-IP" or "VoIP" connection.

A legacy terminal may also retrieve data from a data server on a packet-based data network by connecting over the PSTN to a media gateway, which then connects over the data network to the data server. In this manner, legacy terminals such as cell phones or telephones having a display may access data from data servers such as Web-sites on the World Wide Web.

Eventually, in next generation systems, terminals will have the capability of interfacing directly with a packet-based data network. Smart phones, for example, are being developed to connect directly to Ethernet ports to provide voice connections that are entirely communicated on a data network. As the telecommunication industry transitions from legacy systems to next generation systems, carriers are now commonly employing media gateways that allow transport of legacy communications over packet-switched networks to complete VoIP connections. The following describes how a VoIP call between legacy terminals might be created.

A user of a local legacy terminal places a call to a remote legacy terminal by dialing digits that connect it to a local media gateway ("local MG") controlled by a local media gateway controller ("local MGC"). The local MGC receives the dialed digits from the local terminal and responsively determines which remote media gateway ("remote MG") and remote media gateway controller ("remote MGC") serve the station with those dialed digits. The local MGC may then send a Session Initiation Protocol (SIP) "INVITE" message over the packet-switched network to the remote MGC, seeking to set up a packet-based media session over the network between the local and remote media gateways, and seeking to establish connectivity with the remote legacy terminal. A SIP INVITE message normally carries with it a "Session Description Protocol" block that describes the type of session requested (e.g., voice-over-IP, video, etc.) and other information, such as device capabilities, that will assist the two data network endpoints (i.e. the local and remote media gateways) in setting up a mutually acceptable session. The remote MGC would then respond with a SIP "200 OK" having an SDP containing the SIP address of a remote MGC that services the remote legacy terminal.

Alternatively, the local MG may send the SIP INVITE over the data network using the dialed digits to identify the remote legacy terminal as the destination (e.g. "sip: 3125551234@carrier.com"). The remote MG or the remote MGC may have a SIP client that services the remote legacy terminal. The SIP client becomes operable upon registering on a SIP server connected to the data network. During registration, the SIP client for the user of the remote legacy terminal would designate a callee identifier consisting of the dialed digits. The SIP server detects the INVITE message by the callee identifier and routes it to the SIP client in the remote gateway. In response, the SIP client sends a SIP "200 OK" message containing an SDP that contains a remote media gateway. The local media gateway would then establish a media session with the remote gateway.

The remote gateway may alert (e.g., ring) the remote legacy terminal prior to responding to the SIP INVITE message. If the remote legacy terminal answers, then the remote gateway sends back the SIP "200 OK" message. If there is no answer, or if the connection cannot be made for whatever reason, the remote gateway may respond with an appropriate SIP error message.

Media gateways and media gateway controllers advantageously permit legacy terminals to communicate over data packet-based networks. This capability is growing with the increasing use of softswitches and soft mobile switching centers ("soft MSC"). Softswitches and soft MSCs are network devices that provide service for PSTN subscribers over traditional circuit-switched connections but that also include media gateways and media gateway controllers. Legacy terminals connect to the media gateway and media gateway controller in a softswitch or a soft MSC in their service area via a subscriber line. The media gateway and media gateway controller then provide data sessions over the data network to enable VoIP connections for the legacy terminals served by the softswitch or soft MSC.

Media gateways and media gateway controllers initiate and conduct the data session over the data network using various communications protocols. The communications protocols provide flexibility in creating the data sessions by allowing endpoints to specify various characteristics regarding aspects of the data session. These characteristics may relate to parameters that affect the quality of service over the data connection, the cost of making the connection and many other features that ultimately affect the user's experience during the VoIP call.

Legacy terminals, however, do not provide users with the capability of using the flexibility provided by the communications protocols because legacy terminals do not typically comply with the protocols used in the data network connection. For example, legacy terminals are not typically SIP-compliant in that they are not capable of sending and receiving SIP messages. User may only initiate PSTN connections and must rely on media gateways and media gateway controllers to configure data sessions using communications protocols. Various features and characteristics of the data sessions that may affect the cost to the user and the user's experience are therefore beyond the user's control.

SUMMARY

In accordance with an exemplary embodiment, a method and system provides users of devices having service on a circuit-switched network with the ability to control selected aspects of data sessions on calls that access services available on packet-switched data networks. Such calls typically involve initiating a circuit-switched connection over a serving network of a service provider on a public switched telecommunications network (PSTN) to a media gateway. At the media gateway, a data session connects the circuit-switched connection to a data network resource or, in the case of a Voice-over-Internet Protocol (VoIP) call, to a second media gateway. The second media gateway may then connect the data session to a second circuit-switched connection to a callee. In exemplary embodiments of the invention, users of circuit-switched terminals may advantageously specify selected characteristics of the data session initiated by the media gateway.

In one respect, an exemplary embodiment may take the form of a system in which, during the initiation of a call, a user's terminal sends a call origination message having a session code and a callee terminal identifier identifying a callee terminal. A media gateway controller receives the call origination message via a PSTN connection and queries a profile database for a session profile corresponding to the session code.

The profile database stores a plurality of session profiles for the subscriber. Each session profile comprises at least one data session parameter and each session profile corresponds to a unique session code. The profile database provides one of the session profiles in response to the query for the session profile corresponding to the session code.

The media gateway controller uses the session profile to obtain data session parameters in initiating a data session to communicate with the callee terminal. In preferred exemplary embodiments, the media gateway controller may initiate the data session using a Session Initiation Protocol (SIP) INVITE message. Furthermore, the session profiles may comprise data structures formatted as Session Description Parameter (SDP) blocks.

The media gateway controller signals a media gateway to establish a media stream with a terminating station that services the callee terminal. In VoIP calls, the terminating station is a second media gateway that is capable of connecting with the callee terminal on a second PSTN connection.

The media stream conforms to the data session parameters in the session profile. The media stream may for instance communicate packets formatted in accordance with the Real-time Transport Protocol (RTP) and implement parameters and characteristics found in the session profile. Such parameters and characteristics may designate for example, a specific voice-coding protocol that affects the data signal in ways that affect the user's experience or cost. Alternative VoIP profiles may also implement different uses of the same protocol. For example, for a given voice-coding protocol, a carrier may charge the user more or less for carrying voice at a higher or lower bit rate. The user may be able select VoIP profiles for data sessions that use the G.723.1 voice-coding protocol having different bit rates. In this example, the user may gain control over the cost of making VoIP calls by selecting VoIP proviles according to the bit rate that the carrier uses.

In another respect, an exemplary embodiment may take the form of a method comprising a step of maintaining a plurality of predefined Session Description Protocol (SDP) blocks for use in setting up media sessions over a packet-switched network on behalf of subscriber terminals operable to communicate over the public switched telephone network. The method may further comprise receiving a first directive to use a first one of the SDP blocks in setting up a first media session over the packet-switched network on behalf of a first one of the subscriber terminals. Thereafter, in response to the first directive, the first one of the SDP blocks may be used in setting up the first media session over the packet-switched network on behalf of the first one of the subscriber terminals, in response to the first directive. The method may further comprise a step of receiving a second directive to use a second one of the SDP blocks in setting up a second media session over the packet-switched network on behalf of a second one of the subscriber terminals. Thereafter, in response to the second directive, the second one of the SDP blocks in setting up the second media session over the packet-switched network on behalf of the second one of the subscriber terminals.

In another respect, an exemplary embodiment may take the form of a network device comprising a data packet-based interface connected to a data network. The network device may connect to the PSTN to connect to a caller terminal on a PSTN. The network device may receive a call origination message from the caller terminal. The message may have a session code and a callee terminal identifier from the caller terminal. The network device may comprise a media session processor which may receive a signal from the PSTN interface to send a request to initiate a data session with a callee terminal identified by the callee terminal identifier. The media session processor may associate the data session with a PSTN connection to the caller terminal. The media session processor may also receive a callee address in response to the request to initiate the data session and request and receive a session profile corresponding to the session code. A media stream controller in the network device may connect to the media session processor and to the PSTN interface. The media session processor may signal the media stream controller to create a media stream connection to the callee terminal using the session profile.

And in another respect, an exemplary embodiment may take the form of a method comprising a step of receiving a request to initiate a communication from a calling terminal. The request may carry a session code, which may be detected in the request in accordance with the exemplary method. A corresponding predefined set of packet-data session parameters may be responsively selected and used in extending the communication over a packet-switched network. The method may include the step of generating and sending to a terminating station a data session initiation request that specifies the set of packet-data session parameters.

These as well as other aspects and advantages will become apparent to those of ordinary skill in the art by reading the following detailed description, with reference where appropriate to the accompanying drawings. One of ordinary skill in the art will appreciate that this summary is intended to provide a brief overview of some of the embodiments of the present system, and it is not intended to be an exhaustive or exclusive. The scope of the invention is to be determined by the attached claims and their equivalents.

BRIEF DESCRIPTION OF THE DRAWINGS

Exemplary embodiments of the present invention are described herein with reference to the drawings, in which.

DETAILED DESCRIPTION

1. Overview

In accordance with exemplary embodiments, a system is provided to permit users of devices having an interface to a public switched telephone network ("PSTN") to control selected aspects of data sessions on Voice-over-Internet Protocol ("VoIP") calls or other services available on data networks. When a user initiates a call on a device over the PSTN, a switch routes the call to a media gateway and a media gateway controller. The media gateway controller initiates data sessions using a data signaling protocol such as, for example, the Session Initiation Protocol ("SIP"). The media gateway controller configures the data sessions using data structures containing information communicated by the media gateway controller or used by media gateways in accordance with various communications protocols.

In an exemplary embodiment, the media gateway controller uses the SIP protocol to initiate the data sessions. The data structures are session profiles that preferably conform to the Session Description Protocol and that correspond to an identifying session code. The user may select from various pre-defined session profiles by specifying a session code when dialing digits to initiate the VoIP call. The media gateway controller detects the session code and retrieves a corresponding session profile to configure the data session. In this way, a user may select session profiles in accordance with a desired user experience or costs associated with the call.

Figure 1:
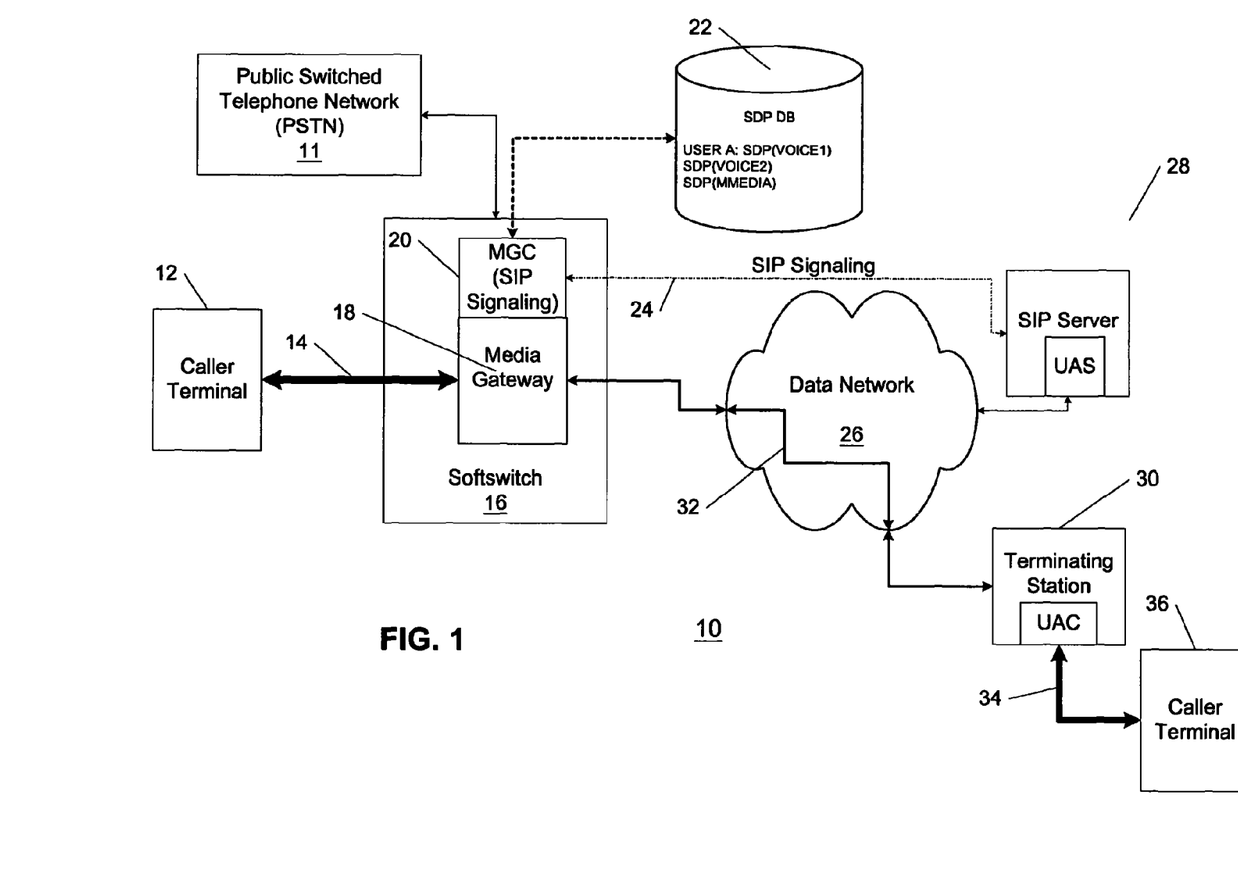
FIG. 1 is a block diagram depicting operation of an exemplary embodiment.

Referring to the drawings, FIG. 1 generally depicts a system 10 comprising a caller terminal 12 connected to a softswitch 16 via PSTN connection 14. The caller terminal 12 may be any communications device having a communications interface to a PSTN 11. It is termed "caller terminal" herein solely for purposes of clarifying its role as the initiator of the communications described in this specification. The PSTN 11 may be any circuit-switched telephony system such as the traditional land-based telephony system or a wireless telephone system such as a cellular network. Embodiments of the present invention are particularly advantageous when the caller terminal 12 is a legacy device unable to connect directly to packet-switched data networks.

In an exemplary embodiment, the softswitch 16 is connected to network device that provides a user with access to a service provider's service. For example, the softswitch 16 connects to a central office switch for landline device users or to a mobile switching center ("MSC") for wireless users. The softswitch 16 also provides an interface to a data network 26 to communicate with other devices connected to the data network 26 such as other softswitches. The softswitch 16 advantageously enables the caller terminal 12 and other circuit-switched legacy devices to access services that are available from data network devices connected to the data network 26. FIG. 1 depicts a terminating station 30 as representing one such data network device.

The terminating station 30 may be another softswitch that may operate to terminate Voice-over-IP ("VoIP") communications to other circuit-switched devices such as a callee terminal 36. The terminating station 30 may also be a media server, portal or other source for services on the data network 26. A user of the caller terminal 12 may wish to connect to the terminating station 30 to obtain, for example, multimedia content. A data connection between the softswitch 16 and the terminating station 30 would provide the caller terminal 12 with access to such services. Examples of data connections between the softswitch 16 and the terminating station 12 that serve the circuit-switched caller terminal 12 are described below with reference to FIGS. 1, 2, and 3.

The system 10 includes a profile database 22 accessible by the softswitch 16. The profile database 22 stores session profiles that may be used in establishing the data session portion of a Voice over Internet Protocol (VoIP) connection between the caller terminal 12 and the callee terminal 36. The session profiles may also be used in establishing the data session portion between the caller terminal 12 and multimedia services accessible via the data access endpoint 30. In accordance with exemplary embodiments, the caller terminal 12 may initiate the connection by communicating a session code to the softswitch 16. The softswitch may detect the session code and use it to query the profile database 22 to select a session profile corresponding to the session code. In alternative embodiments, the user may use the caller terminal 12 to connect to the profile database 22 dialing a feature code or implementing a feature that designed to select a default session profile. Thereafter, calls made by the user implement data sessions that conform to the default session profile.

The use of the session code by the caller terminal 12 provides the user with the ability to control characteristics of the VoIP connection from the caller terminal 12. Such control may result for example by an implementation of a variety of session codes to characterize various types of sessions. The session codes may correspond with session profiles stored in the profile database 22 which define the various types of sessions. The session profiles are preferably sets of parameters defining characteristics for various types of sessions. For example, one profile may include parameters to define characteristics of VoIP connections made by the caller terminal 12. Another profile may define characteristics of multimedia connections made by the caller terminal 12.

Individual session types may have multiple profiles that may have different characteristics. For example, the caller terminal 12 may select from different profiles to make a VoIP connection. One VoIP profile may designate a specific voice-coding protocol that affect the data signal in ways that affect the user's experience or cost, while an alternative profile may designate a different voice-coding protocol. Alternative VoIP profiles may also implement different uses of the same protocol. For example, for a given voice-coding protocol, a carrier may charge the user more or less for carrying voice at a higher or lower bit rate. The user may be able select VoIP profiles for data sessions that use the G.723.1 voice-coding protocol having different bit rates. In this example, the user may gain control over the cost of making VoIP calls by selecting VoIP proviles according to the bit rate that the carrier uses.

2. Exemplary System for Initiating Data Sessions to Service a Legacy Terminal FIG. 1 depicts exemplary embodiments for providing a legacy terminal such as the caller terminal 12 with the ability to control characteristics of connections that include data sessions. The user of the caller terminal 12 may initiate voice communications to the callee terminal 36 by dialing a callee terminal identifier (e.g. a telephone number, such as a Mobile Identification Number (MIN)). In an exemplary embodiment, the digits dialed by the user also include a session code implemented as a feature code as described below. The softswitch 16 receives the session code and the callee terminal identifier on the PSTN connection 14. For example, the session code and callee terminal identifiers may be communicated to the softswitch 16 in a call origination message.

The PSTN connection 14 may comprise a landline or a wireless network connection to the softswitch 16. If the PSTN connection 14 is a landline connection, the subscriber loop terminates at a central office switch that processes the dialed digits. The central office switch preferably communicates with a signaling system that conforms to Signaling System #7 ("SS7") and the advanced intelligent network ("AIN"). If the PSTN connection 14 is a wireless connection, the PSTN connection 14 includes a wireless connection to a base transceiver station (BTS), which then connects the caller terminal 12 to the softswitch 16. The wireless implementation also preferably conforms to the Wireless Intelligent Network ("WIN"). For example, the signaling protocol in the wireless implementation may conform to the IS-41 and IS-771 standards used in typical wireless networks.

In an exemplary embodiment, the session code is a feature code supported by the signaling protocol. Feature codes are specific digit sequences defined by a service provider to activate, deactivate, or modify particular service features. A feature code typically consists of a preceding asterisk or double asterisk followed by a series of numeric digits (e.g. "*nnn" or "**nnn"). In an exemplary embodiment, the session code may be implemented as "*nnn" (e.g. *823). The user may therefore dial "823,xxx-xxx-xxxx" to initiate a VoIP communication from the caller terminal 12. One of ordinary skill in the art will appreciate that the session codes described here are examples. Session codes may take other forms as well.

In an exemplary PSTN connection 14, the central office switch contains service logic that processes the dialed digits. The service logic detects a pattern in the dialed digits that causes the central office switch to create a Time-Domain Multiplex ("TDM") channel (e.g. on a T1 line) that connects to the softswitch 16. The central office switch sends a call origination message containing the session code along with the callee terminal identifier to the softswitch 16 on the TDM channel.

The service logic may connect to a Service Control Point ("SCP") while processing the dialed digits. The SCP may be accessed for information that is specific to the user's service that may also be needed to set up the call to the callee terminal 36. For example, the callee terminal identifier may contain a pattern of digits that signals the central office switch to connect to the softswitch 16. The session code itself may also cause the central office switch to signal the connection to the softswitch 16.

The softswitch 16 in system 10 includes a media gateway (MG) 18 and a media gateway controller (MGC) 20. The softswitch 16 also includes a service logic that conforms to the signaling protocol. The service logic may be part of the MG 18 or the MGC 20. The service logic detects the session code and signals the MGC 20 to retrieve a session profile from the profile database 22.

The media gateway 18 receives signals from the PSTN connection 14 and packetizes the signals for communication on the data network 26. For example, the MG 18 may receive pulse code modulated (PCM) samples communicated on a T1 line. The MG 18 may process the PCM samples and then packetize them for communication over the data network 26 using a media communications protocol such as the Real-time Transport Protocol (RTP). The MG 18 also performs the reverse process during a VoIP or a data connection. That is, the MG 18 receives RTP packets and de-packetizes them for communication over the PSTN connection 14. One of ordinary skill in the art will appreciate that the T1 line and RTP are mentioned here as examples. Other forms of PSTN communication and other transport protocols may also be used.

The MGC 20 provides call processing services for data communications sessions over the data network 26. The MGC 20 may initiate, maintain and teardown data communications sessions between the MG 18 and data network devices such as the terminating station 30. The MGC 20 may use alternative media session protocols to communicate with other data network devices that may comply with other media session protocols. For example, the MGC 20 may use the Session Initiation Protocol (SIP) or the H.323 protocol.

In a preferred embodiment, the MGC 20 uses SIP signaling 24 to initiate data sessions to communicate with the callee terminal 36. For more information regarding the SIP protocol, reference is made to Hanley, Schulzrinne, "SIP: Session Initiation Protocol," RFC 2543, March 1999, which is incorporated herein by reference in its entirety. RFC 2543 is available from the Internet Engineering Task Force ("IETF").

While exemplary embodiments are described herein in the context of using SIP, one of ordinary skill in the art will appreciate that other protocols may also be used.

In exemplary embodiments, the caller terminal 12 connects to the PSTN interface to communicate on VoIP calls. In accordance with SIP, a SIP client initiates the data session portion of the VoIP call. SIP clients typically run only on data network connected devices such as the softswitch 16. Therefore, the caller terminal 12 would not likely be capable of operating as a SIP client, particularly for purposes of communicating via the PSTN interface. In order to use a SIP-initiated data connection in a VoIP call, a SIP client running in the softswitch 16 corresponds with, or links to, the caller terminal 12 connected to the softswitch 16 by the PSTN connection. The nature of the link between the caller terminal 12 and the SIP client typically depends on the VoIP service configuration implemented by specific service providers. For example, the service provider may include SIP clients in the softswitch 16 that correspond with the service provider's subscribers in the service area served by the softswitch 16. When the subscriber initiates a VoIP call, the softswitch 16 receives the caller's identifier (e.g. its MIN in a call origination message) and invokes the subscriber's corresponding SIP client in the softswitch 16.

In a VoIP call, the callee terminal 36 also corresponds with a SIP client. In establishing a VoIP call, the callee terminal's 36 SIP client sends a call termination message to the callee terminal 36. The SIP client also receives the status of the call termination message and responds to a SIP INVITE in accordance with that status. If the caller terminal 12 seeks access to a data service, there would be no need for a PSTN connection between the terminating station 30 and the callee terminal 36. Therefore, the callee terminal 36 would have a SIP client either resident on it, or accessible to it by a data connection, to access the data services desired by the caller terminal 12.

In accordance with SIP, the SIP clients register with a SIP server before they are capable of initiating a data session. The SIP clients register on a SIP server by sending a SIP REGISTER message to their SIP server. The SIP clients preferably register before attempting to initiate a data session such as during the setup of the subscriber's service. The particular scheme for registering SIP clients, however will depend on the service provider's implementation. For example, the SIP client corresponding to the caller terminal 12 may register in a SIP server (not shown) that is accessible to, within or near the MGC 20 in the softswitch 16 that services the caller terminal 12. If the callee terminal 36 uses a different service provider, its SIP client may register on a SIP server 28 connected to the data network. Alternatively, terminals 12, 36 getting service from the same service provider may correspond to SIP clients registered on the same SIP server.

The SIP protocol advantageously supports the use of multiple addressing formats to identify users registered on SIP servers. For example, the caller terminal 12 may be associated with a first SIP client identified by the mobile identifier number (MIN) that identifies the caller terminal 12 with a service provider on a wireless network. Similarly, the callee terminal 36 may be associated with a second SIP client identified by the MIN that identifies the callee terminal 36 with its service provider on a wireless network. If either the caller terminal 12 or the callee terminal 36 is a landline-connected telephone, it may be identified by its Plain Old Telephone Service ("POTS") telephone number.

When the softswitch 16 receives a call origination message, it signals the MGC 20 to initiate a data session. In response, the MGC 20 performs at least two functions, which may occur in any order or simultaneously. One function is to generate a SIP INVITE message to request the SIP client corresponding to the callee terminal 36 to join a data session, and the other is to retrieve a session profile from the profile database 22.

With respect to generating the SIP INVITE message, the MGC 20 formats the message to include the callee terminal identifier, which identifies the destination of the call being setup in the example in FIG. 1. The MGC 20 then broadcasts the SIP INVITE message over the data network 26. Any SIP server connected to the data network 26 may receive the SIP INVITE message. However, only the SIP server 28 on which the SIP client associated with the callee terminal 36 detects the callee terminal identifier as belonging to its SIP client. The SIP server 28 responds to the SIP INVITE by sending a SIP ACK message containing a status code (e.g. "200" which means OK) and a session description protocol (SDP) block. The SDP block may contain an address (e.g. an IP address) for the terminating station 30 connected to the SIP client corresponding to the callee terminal 36. If the data session is being setup to serve a VoIP connection, the terminating station 30 is a terminating media gateway coupled to a terminating media gateway controller (described below with reference to FIG. 2). After sending the SIP ACK message, the terminating station 30 signals, or "rings" the callee terminal 36 to terminate the VoIP connection at a terminating connection 34.

With respect to retrieving the session profile, the MGC 20 queries the profile database 22 for a session profile corresponding with the session code received with the call origination message. The query may occur before the SIP INVITE. If the query occurs before the MGC 20 broadcasts the SIP INVITE, the MGC 20 may format the SIP INVITE message with the session profile included as a parameter. The query may also occur contemporaneously with the SIP INVITE, or it may occur after broadcasting the SIP INVITE.

When the MGC 20 receives the IP address for the terminating station 30 and the session profile from the profile database, it signals the MG 18 to create a media stream 32 with the terminating station 30. The media stream 32 carries the signals that represent the audio and video between the caller terminal 12 and the callee terminal 36. Once the originating MG 18 and the terminating station 30 have the information needed to create the media stream 30, either the MG 18 or the terminating station 30 may create additional media streams to communicate different types of media (i.e. images or video), or to add multiple parties in a VoIP conference call.

The MG 18 may create the media stream 32 using any suitable media communications protocol. The session profile may designate a specific protocol or set of protocols. In a preferred embodiment, the media stream complies with one or more protocols designed to communicate audio and video signals, such as the RTP protocol. The media received or sent by the caller and callee terminals 12, 36 may be formatted as RTP packets at the MG 18 and the terminating station 30 and packaged in payloads of packets that comply with network and transport protocols. Such protocols include the Transport Control Protocol, the Universal Datagram Protocol and the Internet Protocol. Typically, RTP packets are communicated over communications sessions that conform to the well known TCP/IP or UDP/IP protocols. Typically, signaling messages such as SIP messages are communicated on secure TCP/IP connections while media messages such as RTP packets are communicated on faster UDP/IP connections.

For more information regarding the RTP, TCP, UDP and IP protocols, reference is made to:

(1) H. Schulzrinne et al., "RTP: A Transport Protocol for Real-Time Applications," IETF RFC 1889, January 1996, which is incorporated herein by reference;

(2) D. E. Corner, Internetworking with TCP/IP, vol. 1. Englewood Cliffs, New Jersey: Prentice Hall, 1991, which is incorporated herein by reference;

(3) J. Postel, "User Datagram Protocol," IETF RFC 768, August 1980, which is incorporated herein by reference; and (4) J. Postel, ed., "Internet Protocol," IETF RFC 791, September 1981, which is incorporated by reference herein.

In exemplary embodiments, the media stream 32 conforms to the data session parameters contained in the session profile retrieved from the profile database 22. The system 10 described above with reference to FIG. 1 advantageously provides the user with the ability to select specific sets of data session parameters to control aspects of the data session communication. For example, the voice signals received from the caller terminal 12 at the media gateway 18 may be encoded according to one of various encoding standards such as G.711 or G.723.1. Such encoding may require that a bit rate be specified so that the encoded signals may be decoded to substantially reproduce the original voice signals. Service providers may structure the user's service to vary the cost of making the data connection depend on the bit rate chosen. One set of data session parameters may be configured as a higher quality, higher cost "High-Bandwidth" connection while another set may be configured as a lower quality, lower cost "Low Bandwidth" connection. Each set may be designated by a corresponding session code, which the user may dial as described above to select a connection based on the desired quality or cost of the connection.

The system 10 described with reference to FIG. 1 depicts an exemplary embodiment providing a legacy terminal with the ability to control a data session created at a network gateway to access services available on a data network. Additional exemplary systems are described below with reference to FIGS. 2 and 3.

3. Exemplary VoIP Connection from a Wireless Caller Terminal

Figure 2:
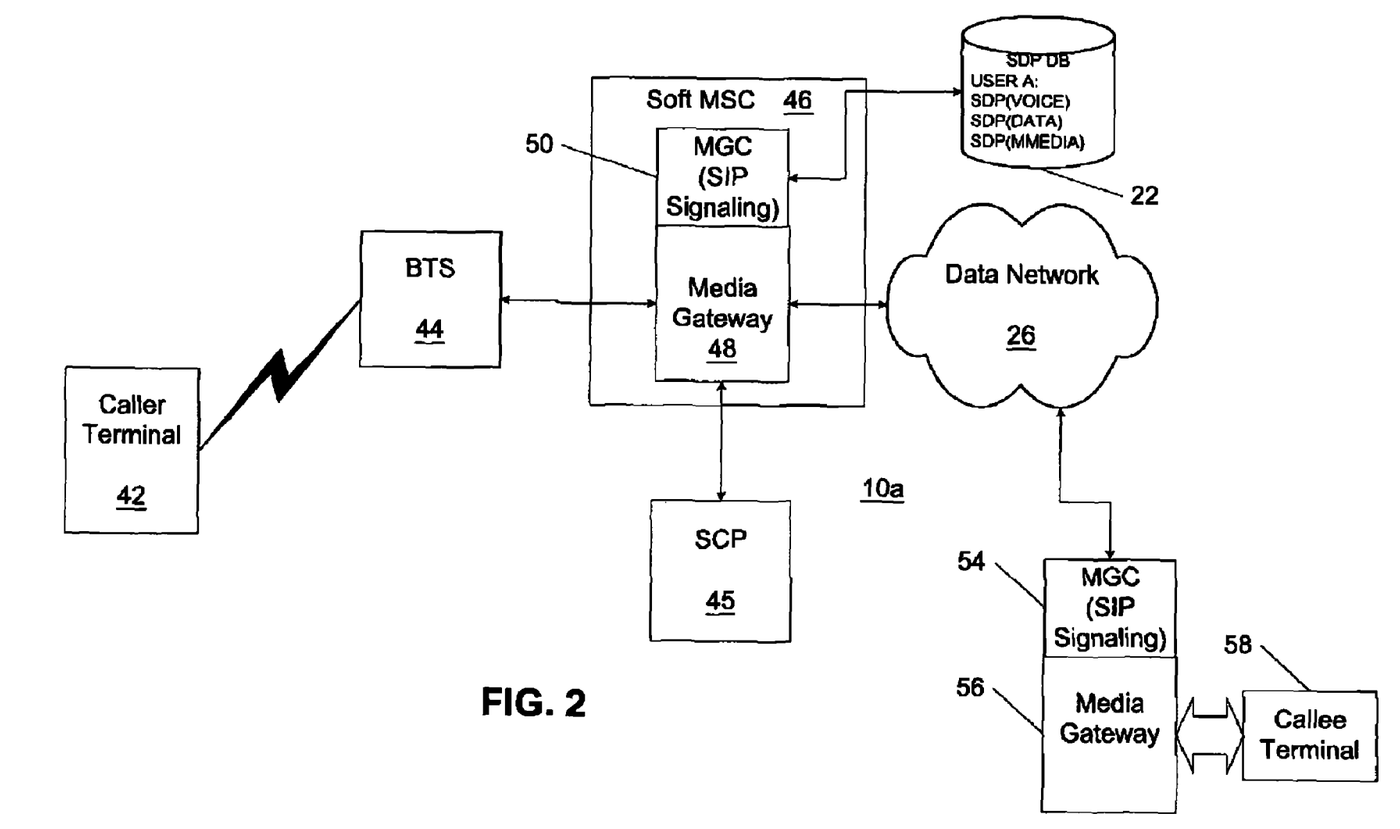
FIG. 2 is a block diagram of the embodiment shown in FIG. 1 in which the caller terminal communicates over a wireless network to communicate on a VoIP connection.

FIG. 2 depicts operation of a system 10a that provides a wireless caller terminal 42 with user control over characteristics of a data session established as part of a VoIP connection in accordance with exemplary embodiments. The wireless caller terminal 42 connects wirelessly to a serving system belonging to a wireless service provider to which the user of the wireless caller terminal 12 subscribes. Operation of the system 10a in FIG. 2 is described below using a VoIP call to a callee terminal 58 as an example.

The serving system preferably comprises a typical wireless network such as a cellular or PCS based wireless network. The serving system also preferably operates using a WIN-based signaling protocol such as ANSI-41. In the system 10a in FIG. 2, the serving system has a base transceiver station ("BTS") 44 and the mobile switching center ("MSC") is implemented as a soft MSC 46 comprising a connection to an SCP 45, a media gateway 48, and a media gateway controller 50. The soft MSC 46 performs the traditional switching functions performed by MSC's in a typical wireless network and also includes a media gateway 48 and media gateway controller 50 that provide subscribers of the wireless network with the ability to connect to parties using VoIP connections.

In an exemplary embodiment, the system 10a implements the session code as a feature code as described above. The user of the system in FIG. 1 may initiate a VoIP call by dialing a session code and a destination telephone number as dialed digits "*CCCxxxnnnyyyy" wherein "*CCC" represents the session code and "xxxnnnyyyy" represents the callee terminal identifier (as a telephone number, or preferably, the callee's MIN). The wireless caller terminal then sends the dialed digits in a call origination message to the BTS 44 over a radio interface. The BTS 44 communicates the call origination message is then communicated to the soft MSC 44.

As shown in FIG. 2, the soft MSC 46 connects to the SCP 45, which contains service logic and information relating to a service provider account belonging to the user of the wireless caller terminal 42. In an exemplary embodiment, the soft MSC 46 refers to the SCP 45 to access such service logic and information as required in processing the call origination message. For example, the ability to make VoIP calls may be a service offered to the user by the service provider that entails added cost to the user. The service logic in the SCP 45 may identify the need to make a data connection to establish a VoIP call and to indicate the user's attempt to establish the VoIP connection for billing purposes. The SCP 45 may identify the need to make a data connection to establish the VoIP call from the session code, from the callee's MIN or from some other indicator in the user's service provider account information.

The soft MSC 45 processes the call origination message in a manner similar to that of the softswitch 16 described above with reference to FIG. 1. The MGC 50 broadcasts a SIP INVITE message designating the callee MIN as the destination over the data network 26. The MGC 50 also retrieves a session profile corresponding to the session code from the profile database 22. As described above with reference to FIG. 1, the session profiles provide the user with options regarding characteristics of the data portion of a VoIP connection and the session code allows the user to select from those options using a legacy wireless terminal.

Referring to FIG. 2, a terminating MGC 54 detects and processes the SIP INVITE message. When the terminating MGC 54 receives the SIP INVITE message, it retrieves an address (e.g. an IP address) for a terminating media gateway 56 that is able to connect to the callee terminal 58. The callee terminal 58 in FIG. 2 may be either a landline or a wireless terminal. The callee terminal 58 is also not SIP-compliant and therefore becomes associated with a terminating SIP client in the terminating MGC 54 or in the terminating MG 56 as described above with reference to FIG. 1.

The terminating MGC 54 signals the callee terminal's 54 serving system to send a call termination (or page) message to the callee terminal 58 in response to the SIP INVITE message. The call termination message causes the callee terminal 58 to "ring." The terminating MGC 54 also sends a SIP ACK message indicating the status of the connection ("OK" or "200" if normal) and containing an SDP block. The SDP block includes the IF address of the terminating MG 56. Which is used by the originating MG 48 to initiate create the media stream that communicates signals between the caller terminal 42 to the callee terminal 58.

In exemplary embodiments, the caller terminal 42 and the callee terminal 58 (if it is a mobile terminal) use data connections directed to or from soft MSC's assigned to them by their service providers. If the mobile terminal is not in its home cell and it attempts to initiate a VoIP call, the BTS 44 may connect to a local MSC or Visitor Location Register (VLR). The soft MSC may then be accessed by the local MSC.

4. Exemplary Multimedia Connection from a Wireless Caller Terminal

Figure 3:
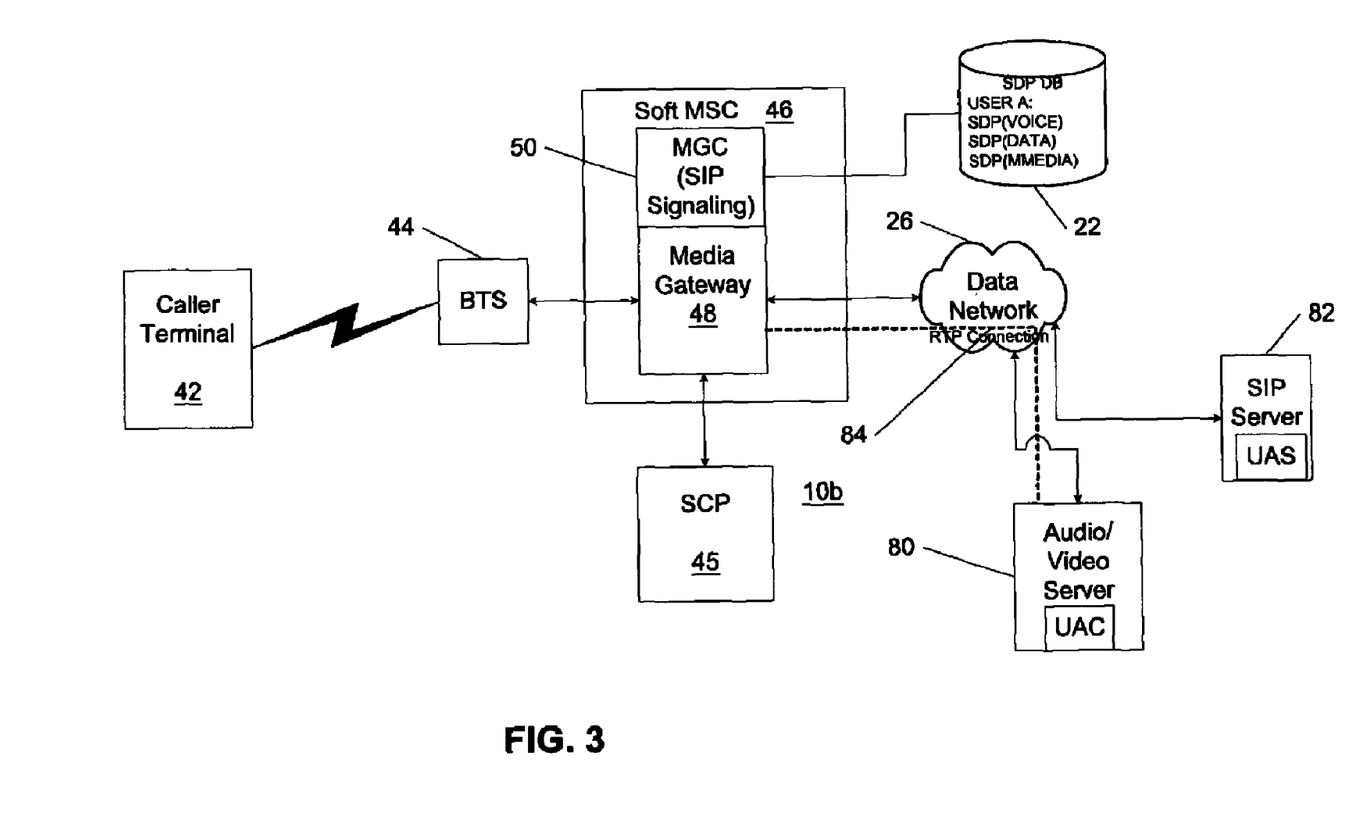
FIG. 3 is a block diagram of the embodiment shown in FIG. 1 in which the caller terminal communicates over a wireless network to communicate on a data connection.

FIG. 3 depicts operation of a system 10b that provides the wireless caller terminal 42 with user control over characteristics of a data session established as part of a multimedia connection in accordance with exemplary embodiments. The wireless caller terminal 42 connects wirelessly to a serving system as described with reference to FIG. 2 and then over the data network to an audio/video server 80. Once connected, the wireless caller terminal 42 may access multimedia resources on the audio/video server 80. For example, the user of the wireless caller terminal 42 may retrieve music, images, or video from the audio/video server 80. In one embodiment, the audio/video server 80 may provide data network telephony resources for a smart phone. In general, the audio/video server 80 may be any resource that is not a legacy device but may nevertheless provide multimedia or communications services to a legacy device such as the wireless caller terminal 42 via the originating MG 48 and the originating MGC 50.

The audio/video server 80 in FIG. 3 uses a SIP client (designated as UAC, or User Agent Client) residing on or near the server 80 to provide multimedia over the data network 26. The SIP client on the audio/video server 80 registers on a SIP server 82 (designated as UAS, or User Agent Server) that communicates over the data network 26.

The wireless caller terminal 42 may initiate the multimedia connection to the audio/video server 80 by sending a call origination message to the soft MSC 46 as described above with reference to FIG. 2. The call origination message contains the session code and a destination identifier. In exemplary embodiments, the destination identifier is any SIP-compliant address for a SIP client that is registered on a SIP server. The destination identifier may be a telephone number, an IP address, or a SIP URL. The MGC 50 receives the call origination message and broadcasts the SIP INVITE message. The SIP server 82 detects the destination identifier identifying the SIP client in the SIP INVITE message. In response to the SIP INVITE message, the SIP server 82 generates a SIP ACK message containing a status (e.g. '200') and a session description (SDP) block. The SDP block may contain a more precise address for the audio/video server 80 with which the MG 48 creates a media stream.

The MGC 50 also retrieves a session profile corresponding to the session code in the call origination message. The MGC 50 retrieves the session profile from the profile database 22. Once the SIP client in the audio/video server 80 has sent the SIP ACK message and the MGC 50 has retrieved a session profile, the MGC 50 may signal the MG 48 to create a media stream 84 using an RTP/UDP/IP or an RTP/TCP/IP connection. In exemplary embodiments, the MGC 50 and the SIP server 82 may exchange SIP messages to control the RTP connection 84. Alternatively, a Real-Time Control Protocol (RTCP) connection may be created to control the RTP connection 84.

5. Exemplary Profile Database

According to an exemplary embodiment, the profile database comprises a storage medium to store a plurality of sets of session profiles. Each set of session profiles corresponds to a user identifier. Each session profile in each set corresponds to a session code. The profile database uses a database controller to receive requests for session profiles. The requests may be implemented as database queries having the session code and the user identifier as parameters.

The session profiles have one or more data packet session parameters that define various characteristics of the data session. The data packet session parameters are also preferably Session Description Protocol (SDP) blocks formatted in accordance with the Session Description Protocol. For more information on the Session Description Protocol, reference is made to RFC 2327 (herein incorporated by reference), which is available from the IETF.

Table I depicts examples of the information that may be stored in SDP blocks to be used as session profiles in accordance with exemplary embodiments.

TABLE 1

| User ID: USERA | USER ID: USER B | USER ID: USERC |
|---|---|---|
| Session_Code = VoIP1 SDP for VoIP using RTP for audio only no encryption connection information | Session_Code = VoIP SDP for VoIP using RTP for audio only no encryption connection information | Session_Code = VoIP1; DEFAULT SDP for multimedia using an RTP stream for audio only no encryption G.723.1: High Bit Rate connection information |
| Session_Code = VoIP2 SDP for VoIP using RTP for audio only encrypted connection information | Session_Code = Mmedia SDP for multimedia using an RTP stream for audio and an RTP stream for video no encryption connection information | Session_Code = VoIP2 SDP for multimedia using an RTP stream for audio only Encrypted G.723.1: Low Bit Rate connection information |
| Session_Code = Mmedia1 SDP for multimedia using an RTP stream for audio and an RTP stream for video no encryption connection information | | |

Table 1 shows lists of information for exemplary session profiles for three hypothetical users (USERA, USERB, USERC). The session profiles are identified by session codes. The session codes are shown in Table 1 as labels that represent the general purpose of the corresponding session profiles. In exemplary embodiments, the session codes are unique feature code strings that the user would dial to select the corresponding session profile. Session codes preferably take the form of well-known feature codes in order to take advantage of the wide reach of the PSTN infrastructures that support feature codes. As feature codes, session codes and the functions they support may be made available quickly to a large number of users. Otherwise, the session codes may take any form that may identify session profiles for purposes of querying the profile database 22.

Session profiles may be configured when a user subscribes to a service by selecting various data session parameters to characterize various desired types of sessions. For example, during service provisioning, the user may determine the types of sessions (e.g. VoIP and multimedia) the user will be making with the device (e.g. legacy caller terminal 12) being provisioned. The user may also determine the types of features and options that should be made available for each type of session. The service provider may create session profiles for each choice made during provisioning, or for other features available to the user. Subsequently, a user may select from different types of sessions by selecting a particular session profile from the users device, such as the caller terminal 12.

Referring to Table 1 for an example, USER A is shown as having two VoIP session profiles. One session profile, which is identified as VoIP1, does not use encryption. The other session profile, which is identified as VoIP2, does use encryption. By using the session code, the choice of which set of data session parameters will be used on a VoIP connection is not left to the system. The user may choose whether to initiate a secure or non-secure connection and dial the session code corresponding to his choice from the user's terminal.

Figure 4:
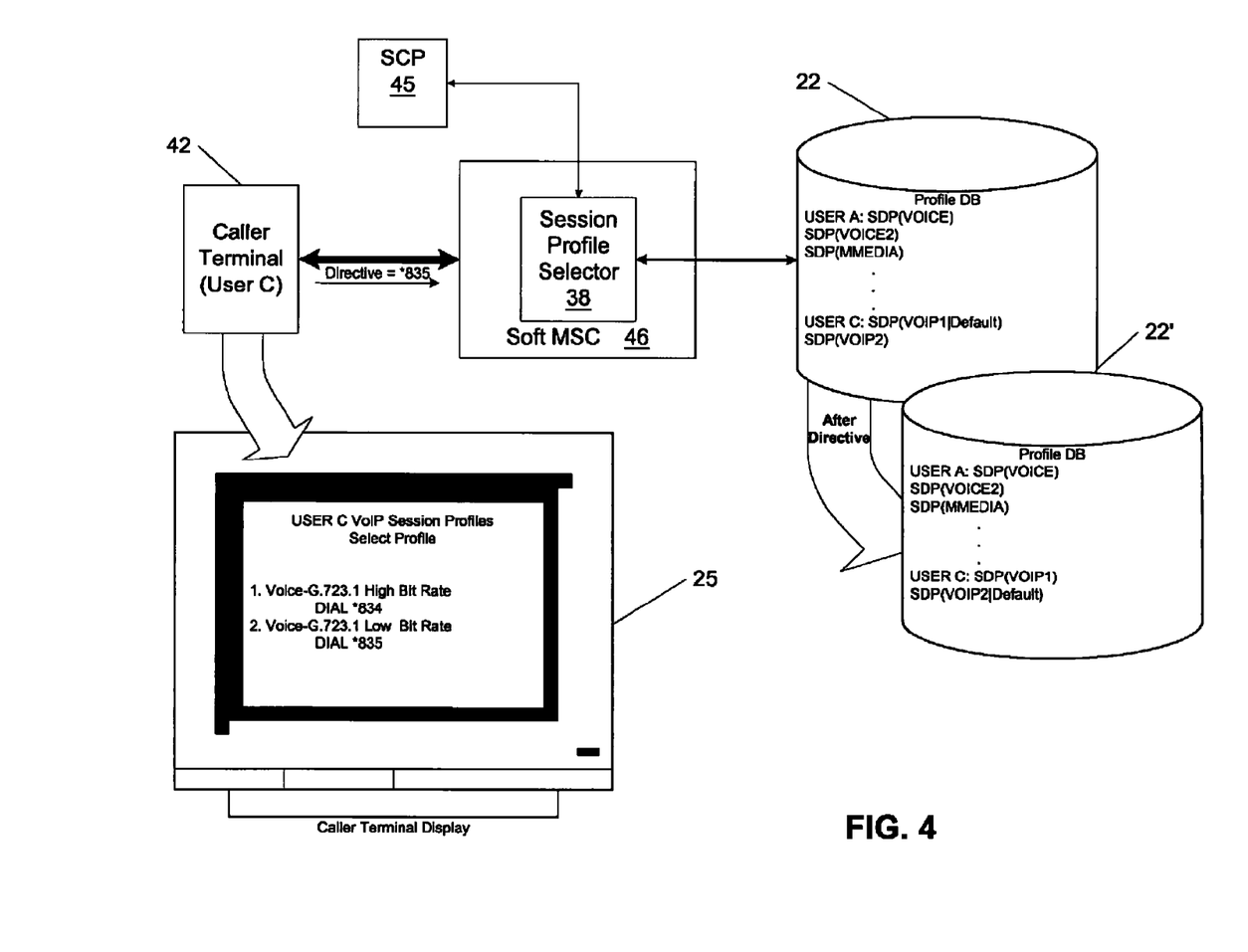
FIG. 4 is a block diagram depicting operation of connections between the caller terminal and the profile database shown in FIG. 1.

In exemplary embodiments, the session code is dialed as a prefix to digits that are dialed when the user initiates a VoIP connection. In an alternative embodiment, functions may be provided to allow users to designate default session profiles that would then be used in future connections. FIG. 4 depicts operation of a session profile selector 38 that may be used by the user of the wireless caller terminal 42 to set a default session profile. The session profile selector 46 is preferably a function of the SCP 46. The session profile selector 46 may also reside on or near the SCP 45. Alternatively, the session profile selector 38 may be implemented in a separate server such as in an Intelligent Peripheral (IP) or a Service Node (SN) that may be accessed by service logic in the soft MSC 46 or in the SCP 45.

The following description of the operation of the session profile selector 38 refers to the sample profiles for USERC in Table I. USERC has a session profile identified as VoIP1 that is set as default. The VoIP1 session code corresponds with a session profile that may be used to create a media stream that uses G.723.1 encoding at a high bit rate. Referring to FIG. 4, the user may enter a menu 25 that contains instructions for selecting an appropriate session profile. The menu 24 in FIG. 4 instructs the user to dial a first directive, which is the feature code designated as "*835" in FIG. 4 on the wireless caller terminal 42 to select the second session profile that uses G.723.1 at a low bit rate. The service logic in the soft MSC 45 detects the feature code and in response connects to the profile database 22 to request to change the user's default session profile. FIG. 4 shows a revised profile database 22' with USERC's default session profile changed to be VoIP2, which corresponds to the VoIP connection using a low bit rate with a G.723.1 encoding scheme.

After the first directive is performed, the user's terminal will be connected on VoIP connections in which the data session conforms to the default session profile corresponding to the VoIP connection using a low bit rate with a G.723.1 encoding scheme. The profile database 22 may be queried during session initiation for the user's default session profile. Alternatively, the session profile selector 38 may be requested to send the user's default session profile to the SIP server on which a SIP client corresponding to USERC's terminal is registered. This would permit session initiation to proceed without any special query to the profile database 22.

In alternative embodiments, the profile database 22 may reside on a server or another WIN-based entity that may provide an interactive method for selecting a default session profile. The interactive method may also display an interactive menu, or provide voice prompts to select a session profile, or both.

6. Exemplary Softswitch

Figure 5:
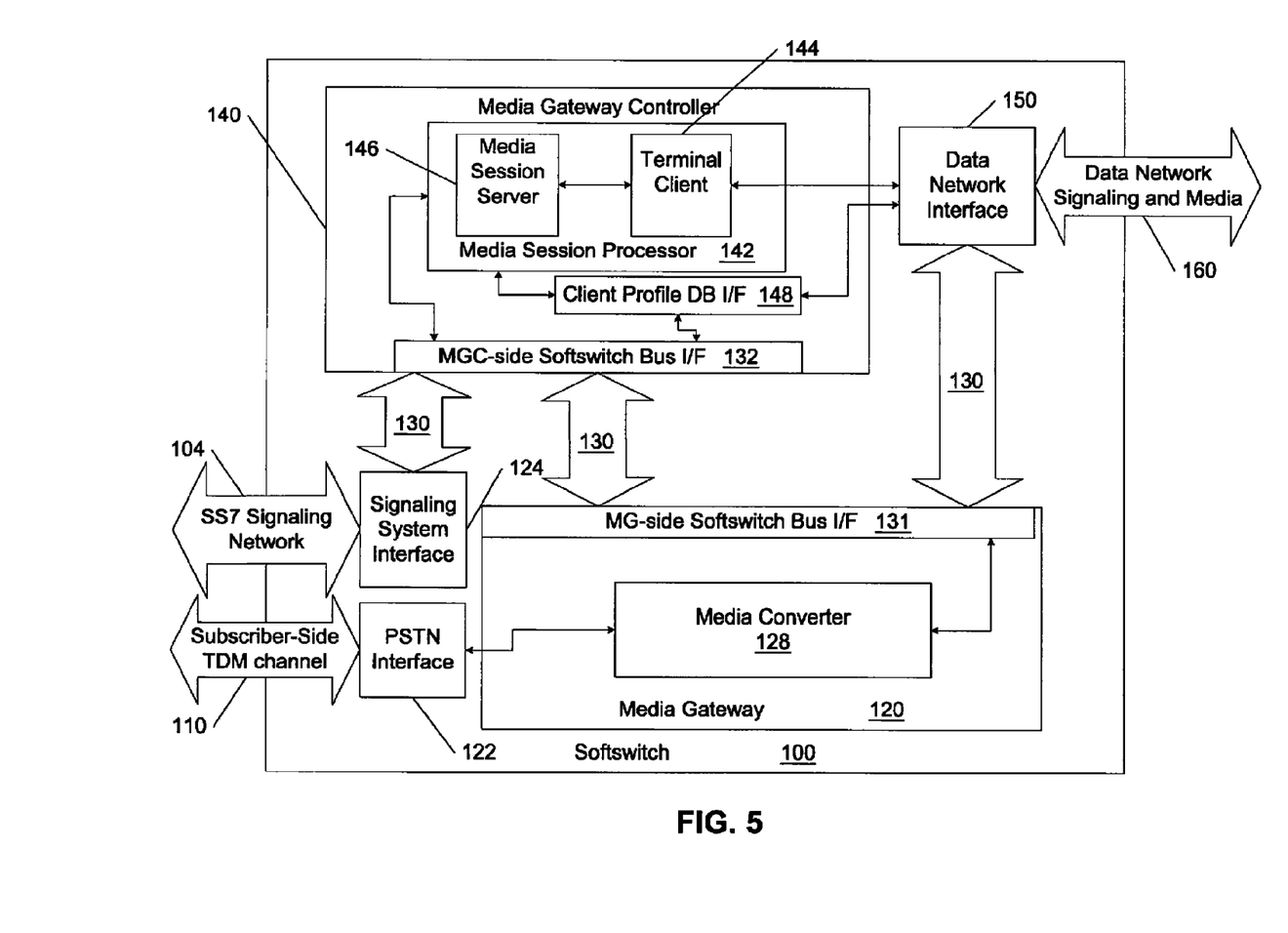
FIG. 5 is a block diagram of an exemplary softswitch.

FIG. 5 shows an exemplary softswitch 100 that may be used in the system 10 shown in FIG. 1. The softswitch 100 comprises a media gateway (MG) 120, a softswitch communications link 130, a media gateway controller (MGC) 140, and a data packet-based interface 150. The softswitch communications link 130 provides a communications pathway to permit communications between the MG 120, the MGC 130, and the data network interface 150. The MG 120 provides an interface between two different networks to allow devices connected to one network to communicate with devices connected to the other. In FIG. 5, the two networks are the PSTN and the data network 26. The MGC 140 controls the MG 120 by communicating messages over the softswitch communications link 130. In exemplary embodiments, the MGC 140 and the MG 120 communicate using the H.323 protocol.

a. Softswitch Interfaces to the PSTN and the Data Network

The softswitch 100 generally provides subscribers on a PSTN service with access to data network resources. The softswitch 100 uses the data network interface 150 for connections that the softswitch 100 makes to network devices connected to the data network 26 (see FIG. 1). The softswitch 100 has a PSTN interface 122 to connect to voice channels on the PSTN such as a TDM channel 110. The PSTN interface 122 may be a signal processor connected to a T1 line, but other connections that carry a voice channel allocated to a user on a call may also be used. For example, in a wireless network, the PSTN interface 122 comprises a connection to a BTS, or to other MSC's.

Typically, subscribers on a PSTN service connect to a central office switch or a serving MSC. The central office switch may have a dedicated softswitch to provide its subscribers with access to data services. Service logic for the user in the central office switch will therefore detect an attempt to use data services. In response, the central office switch will provide a Time-Domain Multiplexed (TDM) channel for the subscriber and connect the TDM channel to the PSTN interface 122 of the softswitch 100. The softswitch 100 will then process call origination messages or other signaling messages that refer to the TDM channel and use the signaling messages to determine the subscriber's data service requirements.

In the wireless network, the serving MSC is preferably the softswitch 100. However, the user's current serving MSC may not include media gateway capabilities. The serving MSC would include service logic that may detect that a call origination message may require data connectivity (e.g. in a VoIP call). The serving MSC would then connect to the softswitch 100 to process the call.

The softswitch 100 also has a signaling system interface 124 to connect to a signaling network 104. The signaling network 104 and the signaling system interface 124 preferably comply with an SS7-based signaling protocol. The softswitch 100 receives signaling messages via the signaling system interface 124 that are related to calls connected to the PSTN interface 122. The signaling system interface 124 communicates information that the MGC 140 may need to initiate a data session over the data network 126 for the user. The subscriber-side call controller 126 may communicate the user's service information, hardware specific connection information to relate the call to the PSTN interface 122, and parameters that characterize specific attributes of either the PSTN connection or the data session or both. In exemplary embodiments, the signaling system interace 124 receives the call origination message containing the session code and the destination identifier for a given call. The signaling system interface 124 may communicate the session code, or information corresponding to the session code that relates to the session profile that the MGC 140 should use to initiate the data session for the call.

b. Media Gateway

Referring to FIG. 5, the MG 120 allows devices connected to the PSTN to communicate with devices connected to the data network 26. The media gateway 120 includes a media converter 128 to convert voice and data signals communicated on the PSTN to data packets communicated on the data network 26. The media converter 128 also performs the converse operation of converting data packets to voice and data signals.

In exemplary embodiments, the media converter 128 receives pulse code modulated digital samples communicated on a T1 line. The media converter 128 processes the samples and encapsulates them in packets, preferably in accordance with selected protocols. The media converter 128 then communicates the packets to the data network interface 150, which may further encapsulate the packets in communications packets in accordance with selected communications protocols.

In an exemplary embodiment, the media converter 128 encapsulates the samples as RTP packets in accordance with the RTP protocol. The media converter 128 may perform various processing steps related to features available on the softswitch 100. The media converter 128 may perform or not perform these processing steps based on messages received from the MGC 140 according to requirements specified for individual calls. These requirements may be specified in the session profile that is used for the call.

For example, in a VoIP connection, the user may be given the choice to establish a high-quality connection or a basic connection and be charged more for the high-quality connection than for the basic connection. The high-quality connection may implement features that improve the quality of the call. Examples of such features may include echo cancellation, noise reduction, and other techniques that improve the sound and security of a VoIP connection. The user may also choose between two session profiles that specify parameters that either enable or disable these features. The session profile for the high-quality connection may enable a selected set of such features, while the session profile for the basic quality connection may enable only a selected few. The user may control the cost of the user's VoIP connections by selecting a session profile that is appropriate for the user's needs. In exemplary embodiments, the user may select the session profiles by using the session code that corresponds with the type of connection desired by the user.

c. Media Gateway Controller

Referring to FIG. 5, the MGC 140 initiates and maintains data sessions that provide a PSTN subscriber with data services using a media session processor 142. The MGC 140 receives call control information from the signaling system interface 124. The MGC 140 may also receive call control information from the profile database 22 (shown in FIG. 1) using a client profile database interface 148. In exemplary embodiments, the MGC 140 detects the session code that may be contained in a call origination message and retrieves a corresponding session profile from the profile database 22. The MGC 140 then uses the information from the session profile and from the signaling system interface to control the data sessions corresponding to the PSTN connections to the MG 120.

In exemplary embodiments, the media session processor 142 initiates and maintains data session using a terminal client 144 and a media session server 146. The terminal client 144 and the media session server 146 in FIG. 5 comply with the SIP protocol. The media session processor 142 may generate and maintain a terminal client 144 for each user that initiates a call via the softswitch 100. Each terminal client 144 would then be registered on the media session server 146 in accordance with the SIP protocol.

Each terminal client 144 may also be associated with the user. For example, the media session processor 142 may receive a request to initiate a data session to serve a VoIP connection for a user and would refer to the user's telephone number or MIN to select the terminal client 144 associated with the user. The association between the terminal client 144 and the telephone number or MIN may be determined by querying the media session server 146 on which the terminal client 144 would be registered. In an alternative embodiment, the media session processor 142 may generate the terminal client 144 and register it on the media session server 146 only after the media session processor 142 receives a request to initiate a data session.

When the MGC 140 receives the call origination message, it also retrieves the destination identifier, or the callee terminal identifier. The callee terminal identifier may be in the form of a telephone number or the callee terminal's MIN (if it is wireless). The MGC 140 uses the callee terminal identifier in a SIP INVITE message and broadcasts the message over the data network 26. A SIP server on which the callee terminal is registered detects the SIP INVITE message by the callee terminal identifier. In response, the SIP server designates a SIP client corresponding to the callee terminal. The SIP client prepares a SIP ACK message and an SDP block containing information about the SIP client and the callee terminal. One piece of information that may be included in the SDP block is an IP address to a device that may operate as an endpoint to a media stream for the data session.

The softswitch 100 may also be on the receiving end of a VoIP connection. Another softswitch may broadcast a SIP INVITE message seeking to establish a data session with a user of the softswitch 100. The media session server 146 may detect the destination identifier in the SDP block of the SIP INVITE message. The media session server 146 would then designate the terminal client 144 for the session and send back an address for the MG 120 in a SIP ACD message. The media session server 142 may then signal the signaling system interface 124 to send a call termination message to the user's terminal. Once the media stream is connected to the MG 120, the MGC 140 would associate the data session with the connection to the user's terminal on the PSTN side.

7. Conclusion

An exemplary embodiment of the present invention has been described above. Those skilled in the art will understand, however, that changes and modifications may be made to this embodiment without departing from the true scope and spirit of the present invention, which is defined by the claims.

I claim:

1. A method of setting up a call from a calling device to a called device, via a softswitch comprising a media gateway and a media gateway controller, wherein a calling user operates the calling device, and wherein the called device has an associated Session Initiation Protocol (SIP) client, the method comprising:

receiving into the media gateway controller a call origination request carrying digits dialed by the calling user on the calling device, the digits dialed by the calling user including (i) a feature code that designates a predefined packet-data session profile and (ii) a telephone number of the called device;

responsive to the call origination request, the media gateway controller consulting a database to determine the predefined packet-data session profile designated by the feature code included in the dialed digits; and the media gateway controller then generating and sending a SIP INVITE message for receipt by the SIP client associated with the called device, including in the SIP INVITE message the determined packet-data session profile, to facilitate setup of the call from the calling device to the called device via a packet-data session extending from the media gateway, wherein the feature code is one selected from a group of feature codes, each corresponding with a respective packet-data session profile, wherein each respective packet-data session profile defines a unique set of packet-based communication session parameters.

2. The method of claim 1, wherein the calling device is not equipped with a SIP client.

3. The method of claim 1, wherein the digits dialed by the user define a digit string including the feature code as a prefix to the called device telephone number.

4. The method of claim 1, wherein the feature code comprises an asterisk followed by feature code digits.

5. The method of claim 1, wherein the determined packet-data session profile defines packet-data session features selected from the group consisting of echo cancellation, noise reduction, and bit rate.

6. The method of claim 1, wherein the determined packet-data session profile comprises a data structure formatted in accordance with the Session Description Protocol (SDP).

7. The method of claim 1, wherein the packet-data session extending from the media gateway comprises a Realtime Transport Protocol (RTP) session.

8. The method of claim 7, wherein the RTP session defines a voice-over-IP session.

9. The method of claim 1, wherein receiving into the media gateway controller the call origination request carrying digits dialed by the calling user on the calling device comprises receiving the call origination request via a public switched telephone network (PSTN) connection.

10. The method of claim 9, wherein the PSTN connection comprises a wireless connection to a base transceiver station (BTS).

11. The method of claim 1, wherein the associated SIP client of the called device is at a media gateway serving the called device.

12. A method of setting up a call from a calling device to a called device, via a softswitch comprising a media gateway and a media gateway controller, wherein the calling device is not equipped with a Session Initiation Protocol (SIP) client, wherein a calling user operates the calling device, and wherein the called device has an associated SIP client, the method comprising:

receiving into the media gateway controller a call origination request carrying digits dialed by the calling user on the calling device, the digits dialed by the calling user defining a digit string that includes (i) a feature code that designates a predefined packet-data session profile and (ii) a telephone number of the called device, wherein the feature code is included in the digit string as a prefix to the called device telephone number;

responsive to the call origination request, the media gateway controller consulting a database to obtain the predefined packet-data session profile designated by the feature code included in the dialed digits; and the media gateway controller then generating and sending a SIP INVITE message for receipt by the SIP client associated with the called device, including in the SIP INVITE message the determined packet-data session profile as a data structure formatted in accordance with the Session Description Protocol (SDP), to facilitate setup of the call from the calling device to the called device via a Realtime Transport Protocol (RTP) session extending from the media gateway, wherein the feature code is one selected from a group of feature codes, each corresponding with a respective packet-data session profile, wherein each respective packet-data session profile defines a unique set of packet-based communication session parameters.

13. The method of claim 12, wherein the RTP session defines a voice-over-IP session.

14. The method of claim 12, wherein receiving into the media gateway controller the call origination request carrying digits dialed by the calling user on the calling device comprises receiving the call origination request via a public switched telephone network (PSTN) connection.

15. The method of claim 14, wherein the PSTN connection comprises a wireless connection to a base transceiver station (BTS).

16. A softswitch configured to set up a call from a calling device to a called device, wherein a calling user operates the calling device, and wherein the called device has an associated Session Initiation Protocol (SIP) client, the softswitch comprising a media gateway and a media gateway controller, wherein the softswitch includes a first interface that receives a call origination request carrying digits dialed by a user of a calling device, the digits dialed by the calling user including (i) a feature code that designates a predefined packet-data session profile and (ii) a telephone number of the called device, wherein, responsive to the call origination request, the softswitch consults a database to determine the predefined packet-data session profile designated by the feature code included in the dialed digits, and wherein the softswitch then generates and sends via a second interface a SIP INVITE message for receipt by the SIP client associated with the called device, including in the SIP INVITE message the determined packet-data session profile, to facilitate setup of the call from the calling device to the called device via a packet-data session extending from the media gateway of the softswitch, wherein the feature code is one selected from a group of feature codes, each corresponding with a respective packet-data session profile, wherein each respective packet-data session profile defines a unique set of packet-based communication session parameters.

17. A system comprising:

a calling device operated by a calling user, the calling device not being equipped with a Session Initiation Protocol (SIP) client;

a called device having an associated SIP client;

a softswitch;

a wireless network connection facilitating communication between the calling device and the softswitch;

a packet-switched network connection facilitating communication between the softswitch and the SIP client associated with the called device; and a database correlating various feature codes with respective packet-data session parameters, wherein the calling device sends an origination message carrying a string of digits including (i) a feature code that designates a predefined packet-data session profile and (ii) a telephone number of the called device, and wherein the softswitch receives the string of digits, the softswitch consults the database to determine the packet-data session profile corresponding with the feature code in the string of digits, and the softswitch then generates and sends a SIP INVITE for receipt by the SIP client associated with the called device, including in the SIP INVITE message the determined packet-data session profile, to facilitate setup of a call from the calling device to the called device via a packet-data session extending from softswitch, wherein the feature code is one selected from a group of feature codes, each corresponding with a respective packet-data session profile, wherein each respective packet-data session profile defines a unique set of packet-based communication session parameters.

18. The system of claim 17, wherein the softswitch comprises a media gateway and a media gateway controller.

19. The system of claim 17, wherein the digits dialed by the user define a digit string including the feature code as a prefix to the called device telephone number.

20. The method of claim 17, wherein the feature code comprises an asterisk followed by feature code digits.

21. The method of claim 17, wherein the determined packet-data session profile defines packet-data session features selected from the group consisting of echo cancellation, noise reduction, and bit rate.

22. The method of claim 17, wherein the determined packet-data session profile comprises a data structure formatted in accordance with the Session Description Protocol (SDP).

23. The method of claim 17, wherein the packet-data session extending from the media gateway comprises a Realtime Transport Protocol (RTP) session.

24. The method of claim 23, wherein the RTP session defines a voice-over-IP session.

* * * * *